May 27, 1924.
N. A. BOEHM
COOKING UTENSIL
Filed March 18, 1922
1,495,395
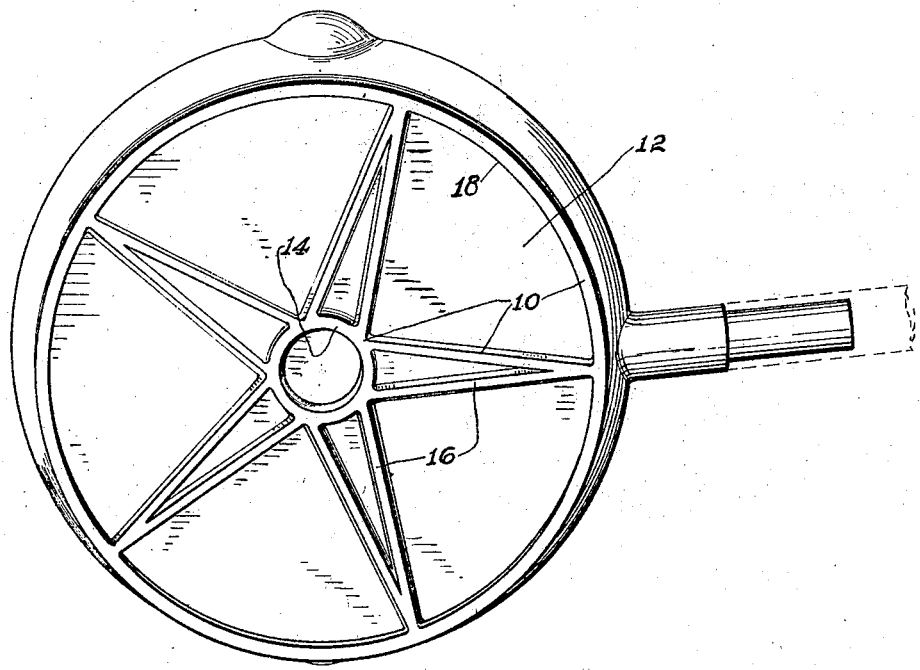
Inventor
N. A. Boehm
By Brown, Bosmeyer, Renner
Attorneys Patented May 27, 1924.

1,495,395

UNITED STATES PATENT OFFICE.

NICHOLAS A. BOEHM, OF MILWAUKEE, WISCONSIN.

COOKING UTENSIL.

Application filed March 18, 1922. Serial No. 544,732.

*To all whom it may concern:*

Be it known that I, NICHOLAS A. BOEHM, a citizen of the United States, residing at Milwaukee, and State of Wisconsin, have invented a certain new and useful Improvement in Cooking Utensils, of which the following is a full, clear, concise, and exact description, reference being had to the accompanying drawings, forming a part of this specification.

My invention relates to cooking utensils, and more especially to a utensil designed for direct exposure to a heating flame on its under surface, as in frying and similar cooking operations.

The primary object of my invention is to produce a cooking utensil having a lower surface shaped for maximum efficiency in receiving heat from the products of combustion, which will nevertheless operate without being warped by the high surface temperatures involved.

Further objects and advantages of the invention will become apparent as the description proceeds.

In the accompanying drawing, the illustration is a perspective bottom view of a frying pan constructed according to the principles of my invention.

It is well known that irregularities or pockets in the lower surface of such a utensil, retard the flow of the products of combustion from under the bottom of the utensil, and more or less increase the contact area for the reception of heat. A fundamental requirement for satisfactory use of any such utensil is that the upper, or heat delivering surface of the bottom shall always remain absolutely flat, so that grease or other liquids in the pan will readily flow so as to cover the entire surface and prevent scorching. As soon as the center or one side of the bottom of the utensil bulges up even a very small fraction of an inch, satisfactory cooking with the utensil becomes a matter of constant attention and no little annoyance, so that the utensil is usually thrown away as soon as it becomes slightly warped.

The high surface temperatures at the bottom surface of the bottom of the utensil, resulting from the formation of pockets to hold the products of combustion in contact with the utensil, increases the tendency to warp to such an extent that unless the ribs themselves provide substantially all the additional strength and rigidity necessary to prevent warping, the thickness of the bottom itself must be so much increased that the beneficial effect of the ribs is largely eliminated.

According to my invention, I design ribs 10 projecting below the bottom of 12 of the pan in the form of a structurally very rigid system of braces, so that their effect in stiffening the bottom will be reasonably proportional with their effect in raising the surface temperatures thereof.

In the embodiment disclosed, I employ a central circular rib 14 of about one-sixth the diameter of the entire bottom, and a plurality of spaced ribs 16 joining the central rib 14 with the outer edge rib 18. Ribs 16 preferably diverge substantially enough to intersect each other where they meet rib 14, and also where they meet rib 18.

Without further elaboration, the foregoing will so fully explain advantages of my invention, that others may, by applying their knowledge, readily adapt the same for use under various service conditions, without eliminating certain features which may properly be said to constitute the essential items of novelty involved, which items are intended to be defined and secured to me by the following claims:

I claim:

1. A cooking utensil having, in combination, a bottom plate, a continuous imperforate rib on the heat receiving surface of said plate adjacent the outer edge thereof, a concentric rib near its center, and substantially V-shaped ribs connecting the concentric ribs, the adjacent arms of successive ribs being connected to the inner circular rib at adjacent points.

2. A cooking utensil having, in combination, a bottom plate, a continuous imperforate rib on the heat receiving surface of said plate adjacent the outer edge thereof, a concentric rib near its center, and straight ribs interconnecting the concentric ribs to form inwardly and outwardly opening V's, each straight rib intersecting both the inner and outer concentric ribs substantially at the point of intersection of another straight rib.

In witness whereof, I hereunto subscribe my name this 15th day of March, 1922.

NICHOLAS A. BOEHM.